(No Model.)
C. SPERRY.
MICROMETER SCALE.
No. 452,054. Patented May 12, 1891.
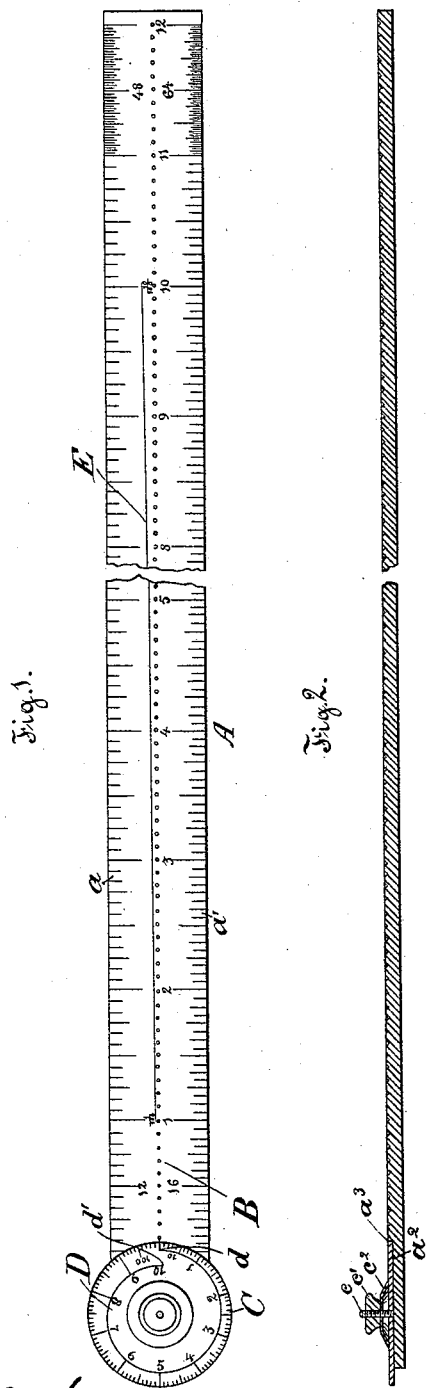

UNITED STATES PATENT OFFICE.

CHARLES SPERRY, OF PORT WASHINGTON, NEW YORK.

MICROMETER-SCALE.

SPECIFICATION forming part of Letters Patent No. 452,054, dated May 12, 1891.

Application filed August 13, 1890. Serial No. 361,869. (No model.)

*To all whom it may concern:*

Be it known that I, CHARLES SPERRY, of Port Washington, in the county of Queens and State of New York, have invented a new and useful Improvement in Rules, of which the following is a specification.

My invention relates to an improvement in rules for the use of draftsmen, engineers, surveyors, architects, &c., in measuring and calculating strain diagrams, force plans, indicator-cards, and other operations in graphostatics and arithmography, and for general use where it is desired to measure by small distances, the object being to provide convenient and effective means for applying the points of dividers, the pen and pencil, so as to secure quickly and accurately various measurements to a very small fraction of distance.

A practical embodiment of my invention is represented in the accompanying drawings, in which—

Figure 1 is a top plan view of the rule. Fig. 2 is a view of the same in longitudinal transverse section; and Fig. 3 is an enlarged view in detail, showing several of the holes or indentations with the point of a divider on one of them, as in measuring.

A represents the body portion of the rule and in the form of my invention which I have herein shown. It is subdivided along one of its edges, as $a$, into one-twelfth inch and along its opposite edge, as $a'$, into one-sixteenth inch. Throughout its length, and preferably along its central portion, as herein shown, the said body portion A is provided with a series of holes or indentations B, which for the purpose of illustrating my invention I have here shown as one-tenth inch apart. The holes or indentations B are made in conical form, as more clearly shown in Fig. 3, the apex $b$ of the hole or indentation being at the exact point from which the measurement is to be taken.

At one end of the body portion A a wheel C is secured so that it may be rotated to bring any point in its circumference as may be desired into alignment with the series of holes or indentations B. As a matter of construction I find it desirable to provide the end of the body portion A with a recess $a^2$ the thickness of the wheel C, and to form the wall $a^3$ of the recess curved to conform to the arc of the periphery of the wheel C. I also find it desirable to secure the wheel C in position upon a stud $c$ by means of a thumb-nut $c'$ and to interpose between the nut $c'$ and the upper face of the wheel a spring-washer $c^2$, in order to apply to the wheel a sufficient amount of friction to cause it to retain any position into which it may be turned without liability of displacement except when positively turned. The wheel C is intended to move loosely about the stud $c$, and for convenience in turning it I prefer to mill its periphery. The face of the wheel C is provided with a spiral line D, beginning at a point $d$ near its edge and terminating at a point $d'$ on a radial line with the point $d$ and at a predetermined distance therefrom. In the present instance the distance between the beginning and the terminal of the spiral line is made one-tenth inch, and the periphery of the wheel is subdivided into ten equal parts, and each of these again into ten equal parts, so that the spiral line from its point of beginning to the first one-tenth subdivision approaches the center of the wheel one-tenth of the entire distance between its beginning and its terminal—namely, one-tenth of one-tenth inch, or one one-hundredth inch in the present instance. It follows, therefore, that the spiral line from the point of its beginning to the first of the small subdivisions, or one one-hundredth of its length, approaches the center of the wheel one one-hundredth of one-tenth inch, or one one-thousandth inch in the present instance. It is intended that the beginning of the spiral line shall correspond with the first of the series of holes or indentations B when the wheel is turned, so as to bring the said beginning into line with the holes, and this in the present form of my invention would bring said beginning into position just one inch from the first main subdivision of the rule.

To use the wheel in connection with the series of holes or indentations, one point of the dividers will be placed in one of the holes or indentations, and will readily center itself therein because of the conical shape of the indentation, and the wheel C, having been turned to represent the fractional part of one-tenth inch desired, the other point of the dividers will be placed upon the spiral line at the point where it is in alignment with the series of indentations.

For example, suppose it be required to measure 1.125. This equals 1.1, .02, and .005. Therefore the point of the dividers would be placed in the first indentation to the right of the main subdivision 1 on the rule, and the wheel C would be turned to bring the fifth small subdivision after the main subdivision 2 on the wheel into alignment with the series of holes, and the other point of the dividers would then be placed on the spiral line at the point where the said fifth subdivision line intersects it.

In order to secure independent measurements less than one-tenth inch or less than any predetermined given distance, I find it convenient to run an oblique line E, beginning at a point corresponding to the beginning of the first subdivision B and extending to a point laterally distant from the main subdivision 10—for example, one-tenth inch or whatever the predetermined unit of measure may be. From this it follows that the distance from the center of an indentation B laterally to the line E will increase by one one-hundredth of the unit or one one-thousandth inch for each successive hole or indentation throughout the series of the ten main subdivisions. I have also for convenience provided the end of the rule opposite that to which the wheel D is attached with small subdivisions of an inch, the one edge representing one forty-eighth inch and the other one sixty-fourth inch in the common and well-known manner.

While I have here shown the series of holes or indentations and the wheel of a convenient size to measure one-tenth inch, one one-hundredth inch, and one one-thousandth inch, it is obvious that they might be arranged upon the same principle to represent subdivisions of any other unit desired and in accordance with any desired scale. It is further obvious that the location of the wheel C at the end of the rule is a matter of convenience and choice rather than that of necessity, and that it might be otherwise located upon the rule and its function remain the same. It is also obvious that the spiral line on the wheel might be replaced by a spiral series of dots or indentations or by a spiral series of arcs.

What I claim as my invention is—

1. The combination, with the body portion of a rule and a series of subdivisions formed thereon, of a rotary part subdivided with respect to a spiral line and so located that its subdivisions may be brought in alignment with the series of subdivisions on the body of the rule, substantially as set forth.

2. The combination, with the body portion of a rule provided with a series of conical-shaped holes or indentations located at predetermined intervals apart, of a rotary wheel supported upon the rule and provided with a series of subdivisions with respect to a spiral line on the wheel, the wheel being arranged to bring its spiral subdivisions successively into alignment with the indentations upon the body portion of the rule, substantially as set forth.

3. The combination, with the body portion of a rule and a series of subdivisions thereon, of a wheel loosely mounted upon the face of the rule and held under frictional pressure, the said wheel being provided with a spiral series of subdivisions for use with the series of subdivisions on the body portion of the rule, substantially as set forth.

4. The combination, with the body portion of a rule provided with a series of indentations located at a predetermined distance apart, and a wheel mounted upon the rule and provided with a spiral series of subdivisions for the purpose of increasing by small fractions the distance or distances indicated by the subdivisions upon the body portion, of a line on the body of the rule drawn oblique to the series of indentations for the purpose of securing independent measurements, substantially as set forth.

CHARLES SPERRY.

Witnesses:
FREDK. HAYNES,
K. E. PEMBLETON.